O. Stoddard,

Cutting Shingles.

No. 1,457. Reissued Apr. 21, 1863.

Witnesses

Henry A. Patterson

H. James Weston

Inventor

Oren Stoddard

By Thos D. Lowe Atty

AM. PHOTO-LITHO. CO. N.Y. (OSBORNE'S PROCESS)

UNITED STATES PATENT OFFICE.

OREN STODDARD, OF BUSTI, NEW YORK.

IMPROVEMENT IN SHINGLE-MACHINES.

Specification forming part of Letters Patent No. 26,533, dated December 20, 1859; Reissue No. 1,457, dated April 21, 1863.

*To all whom it may concern:*

Be it known that I, OREN STODDARD, of Busti, in the county of Chautauqua and State of New York, have invented certain new and useful Improvements in Shingle-Machines; and I do hereby declare that the following is a full, clear, and exact description of the same, reference being had to the accompanying drawings, making a part of this specification, in which—

Figure 1:
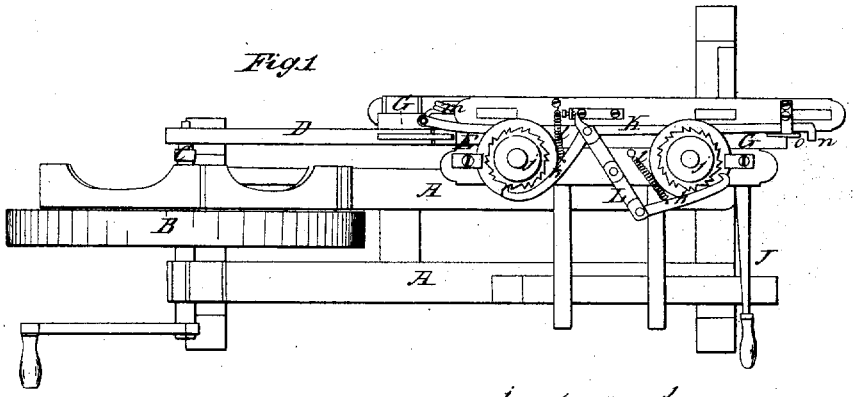
Figure 2:
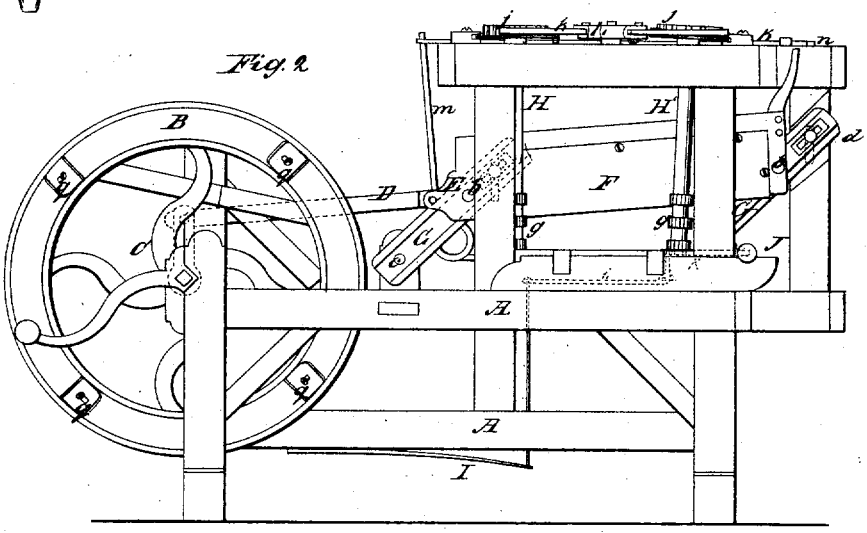

Figure 1 is a plan or top view of my machine. Fig. 2 is a side elevation of it.

This invention relates to certain improvements in that class of shingle-machines in which a reciprocating knife is employed for cutting shingles from the bolt.

These improvements consist in, first, the relative arrangement of the knife-frame and connecting-rod by which the general or mean direction of the draft of the said connecting-rod is made to conform to the longitudinal direction of the knife-frame, and nearly so to cutting-edge of the knife, by which the force applied to give the cutting action is made to counteract, at least partially, the tendency of the upward pressure or resistance of the shingle-bolt to bend the frame and buckle the knife, as set forth; second, the combination, with the cutting-knife and connecting-rod, and with the balance-wheel by which their motion is regulated, of a jointer, the parts being severally constructed and arranged in relation to each other as set forth; third, the combination of the rotary feeding apparatus with the cutting-knife, as set forth; fourth, the combination, with the cutting-knife, of adjustable guides or slides by which the obliquity of the cut and the action of the knife may be varied, as hereinafter set forth.

A represents the frame of the machine, which may be constructed in any proper way to support the working parts.

B is a fly-wheel placed in said frame at one end, and having a crank, C, at one end of its shaft. This crank is connected by a connecting-rod, D, to the knife gate or frame E. This knife gate or frame is formed of continuous metal bars so bent as to form three sides of a parallelogram, the lower side being open, as shown.

The knife F is formed of a thin steel plate of equal thickness throughout, the edge being formed by a basil, as usual. Said knife F is attached to the frame E by bolts, or screws, or rivets, and in boring the holes therefor care should be taken to give them a very little draw, so as to make the knife perfectly taut and stiff in the frame. The knife is attached to the inner side of the gate or frame. Two friction-rollers are attached to the outer side of the gate or frame by means of the bolts or pins *b b*, which extend through the frame and form axes or journals at the outer end upon which these rollers may revolve, one of these rollers being attached to each end of the frame. These friction-rollers work in guides G G, which are attached to the frame A.

The guides G are simply metal bars grooved longitudinally to receive the friction-rollers, and the lower part of each guide is attached to the main frame by a screw or bolt, *c*. In the upper part of each guide an oblong slot, *d*, is made longitudinally, and through each slot *d* a screw-bolt, *e*, extends to fasten the upper end of the slide, said bolts also extending through vertical slots in the frame A. It will be observed that by this means of attaching the guides G G to the frame they may be adjusted in a more or less inclined position, and either parallel with each other or not, as may be desired, thereby furnishing a ready and adequate means of varying the action of the knife to adapt it to the work to be performed and the timber to be worked.

In the frame A and just back of the knife F there are placed two vertical shafts, H H′, the lower parts of which are provided with fluted or spurred sections *g g*, to take hold of the timber to be worked. The shaft H is fitted in permanent bearings, but the lower bearing of the shaft H′ is hung in a slide, *h*, one end of which is connected with a bent lever, *i*, (shown in dotted lines,) and having a weight or spring, I, attached, the opposite end of the slide being connected with a hand lever, J, to furnish the means for conveniently drawing it back for the insertion of the block. On the upper end of each shaft H H′ a ratchet-wheel, *j*, is secured, the teeth of said wheel being alternately long and short to give the proper taper to the shingles, as shown in Fig. 1. Into each of these ratchet-wheels *j* a pawl, *k*, catches, the pawls being kept engaged therewith by springs *l*. One of these pawls is connected directly to a slide, K, as represented in Fig. 1. The other is connected to it through the medium of the lever L. One end of the slide K is connected to a spring, *m*, which has a tendency to keep the slide at the end of its movement in the direction toward the fly-wheel. The opposite end of the slide K has a lateral projection, *n*, and the end of the knife gate or frame has a vertical projection, *o*, which strikes against the projection *n* at the end of the stroke to feed the block forward to the knife. One side of the balance-wheel B is made true and smooth, and is provided with mortises which receive the plane-irons *q*, for jointing the shingles. This arrangement, while it is simple and the parts directly connected, allows and gives the means for jointing the shingles, and at the same time equalizes the motion of the cutting-knife.

The operation is as follows: The bolt is placed on the frame A and endwise between the fluted sections of H H′, so that one of these sections *g g* may bear against each end of the bolt. Motion is given to the shaft of the fly-wheel B by any convenient power, and a reciprocating motion is given to the knife F by means of the crank C and connecting-rod D. The knife F has a more or less oblique movement, the obliquity of the cut being regulated by adjusting the guides G G, as previously alluded to. The bolt is fed to the knife just previous to its upward stroke being terminated, or rather I should perhaps say, the termination of its upward stroke in consequence of the projection *o* on the gate or knife frame E striking the projection *n* on the slide K, which is thereby moved a certain distance and the pawls made to actuate the ratchet-wheels *j j* simultaneously and in reverse directions; but the pawls do not both operate upon the same length of teeth at the same time. When one engages a short tooth, the other takes hold of a long one, and by this means the proper taper is given to the shingle, the point being cut alternately from each end of the bolt. When the knife commences its downward movement, the spring *m* throws the slide K back to its original position, so that the pawls can engage with the ratchet-wheels for a succeeding operation. In some qualities of timber a greater drawing cut is necessary than is useful in others, and in some a somewhat rolling cut may be for some reasons desirable. By properly using the means I have provided by making the obliquity of the slides adjustable either species of cut may be obtained or varied to any necessary extent. It is found that the fluted rollers for feeding combine satisfactorily with the cutting-knife, and that their several and joint operations are performed in the combination. It will be observed also that the pull of the connecting-rod is directly endwise upon the knife frame, which in itself has a tendency to extend or stretch the edge of the knife; but this tendency is counteracted by the upward pressure of the bolt, which has a tendency in the opposite direction, so that these two forces nearly or quite neutralize each other, and by this arrangement the knife is very much relieved from the strain to which it would otherwise be subjected.

I claim—

1. The relative arrangement of the knife-frame E and connecting-rod D by which the pull of the latter is made to act lengthwise of the former, as herein before described.

2. The combination of the jointing-planes *q* with the fly-wheel B, connecting-rod D, and knife F, as described, when all the parts are arranged in relation to each other as set forth.

3. The combination of the fluted rollers H H′, provided with ratchet wheels and operated by pawls, as represented, with the cutting-knife F, as set forth.

4. The combination with the cutting-knife F, of the adjustable guides G G, by which the cut of the knife can be varied, as herein set forth.

OREN STODDARD.

Witnesses:

ABRAM FRANK,

C. A. FARGO.